United States Patent
Zheng et al.

(10) Patent No.: US 11,445,417 B2
(45) Date of Patent: Sep. 13, 2022

(54) STATE PROCESSING METHOD, USER EQUIPMENT AND BASE STATION

(71) Applicant: VIVO MOBILE COMMUNICATION CO., LTD., Guangdong (CN)

(72) Inventors: Qian Zheng, Guangdong (CN); Ran Yue, Guangdong (CN); Xiaodong Yang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 32 days.

(21) Appl. No.: 16/959,770

(22) PCT Filed: Dec. 29, 2018

(86) PCT No.: PCT/CN2018/125477
§ 371 (c)(1),
(2) Date: Jul. 2, 2020

(87) PCT Pub. No.: WO2019/134619
PCT Pub. Date: Jul. 11, 2019

(65) Prior Publication Data
US 2020/0367119 A1     Nov. 19, 2020

(30) Foreign Application Priority Data
Jan. 4, 2018  (CN) .......................... 201810009128.2

(51) Int. Cl.
*H04W 36/00*     (2009.01)
*H04W 76/27*     (2018.01)
(Continued)

(52) U.S. Cl.
CPC ....... *H04W 36/0072* (2013.01); *H04L 5/0098* (2013.01); *H04W 36/0069* (2018.08);
(Continued)

(58) Field of Classification Search
CPC .. H04L 5/0053; H04L 5/0098; H04W 72/042; H04W 76/27
See application file for complete search history.

(56) References Cited

U.S. PATENT DOCUMENTS

| 2013/0053082 A1 | 2/2013 | Cha et al. |
| 2013/0194947 A1 | 8/2013 | Ehsan et al. |

(Continued)

FOREIGN PATENT DOCUMENTS

| CN | 102237936 A | 11/2011 |
| CN | 107113673 A | 8/2017 |

(Continued)

OTHER PUBLICATIONS

Extended European Search Report dated Jan. 25, 2021 issued in PCT/CN2018/125477.

(Continued)

*Primary Examiner* — Nam T Huynh
(74) *Attorney, Agent, or Firm* — Brooks Kushman P.C.

(57) ABSTRACT

A state processing method, a user equipment and a base station are provided. The method includes: receiving state configuration information sent by a base station; and determining, based on the state configuration information, whether to set an initial state of the secondary cell and an initial state of a Bandwidth Part (BWP) associated with the secondary cell to a new state, where the new state is a state between an activated state and a deactivated state, and a quantity of secondary cells configured by the base station for a user equipment is at least one.

18 Claims, 4 Drawing Sheets

(51) Int. Cl.
    *H04W 36/08*     (2009.01)
    *H04W 76/15*     (2018.01)
    *H04W 72/04*     (2009.01)
    *H04L 5/00*     (2006.01)

(52) U.S. Cl.
    CPC ......... *H04W 36/08* (2013.01); *H04W 72/042* (2013.01); *H04W 76/15* (2018.02); *H04W 76/27* (2018.02); *H04L 5/001* (2013.01)

(56) References Cited

U.S. PATENT DOCUMENTS

| | | |
|---|---|---|
| 2016/0198448 A1 | 7/2016 | Takeda et al. |
| 2019/0045491 A1* | 2/2019 | Zhang ............... H04W 72/1289 |
| 2020/0045602 A1 | 2/2020 | Jiang |
| 2020/0068571 A1 | 2/2020 | Jiang |
| 2021/0211913 A1 | 7/2021 | Takeda et al. |

FOREIGN PATENT DOCUMENTS

| | | |
|---|---|---|
| CN | 107223359 A | 9/2017 |
| JP | 2015033015 A | 2/2015 |
| KR | 1020140125805 A | 10/2014 |
| WO | 2012150499 A1 | 11/2012 |
| WO | 2014112783 A1 | 7/2014 |
| WO | 2019087340 A1 | 5/2019 |

OTHER PUBLICATIONS

3GPP TSG RAN WG2 #99-Bis; R2-1710135; Prague, Czech Republic, Oct. 9-13, 2017; "Activation and deactivation of Scells"; 2 pages.
3GPP TSG-RAN2 Meeting #100; R2-1712255 (Revision of R2-1710138); Reno, USA, Nov. 27-Dec. 1, 2017; "Fast SCell activation for enhanced CA utilization"; 8 pages.
3GPP TSG-RAN WG2 Meeting #101; R2-1803564 (Resubmission of R2-1801432); Athens, Greece, Feb. 26-Mar. 2, 2018; "Dormant BWP for fast SCell activation"; 2 pages.
First Office Action dated Dec. 26, 2019 issued in Chinese Application No. 201810009128.2.
3GPP TSG RAN WG1 #90bis, R1-1718580, Prague, Czech Republic, Oct. 9-13, 2017, "Open Issues BWP", 8 pages.
3GPP TSG RAN WG1 #90bis, R1-1718581, Prague, Czech Republic, Oct. 9-13, 2017, "Open Issues on CA", 10 pages.
Intel Corporation,Activation of SCell containing BWPs[online],3GPPTSG RAN WG2#99bis R2 /1711643, Internet,2017, Jan. 29, 2009.
Nokia, Nokia Shanghai Bell,Running CR for euCA Stage / 2[online],3GPP TSG RAN WG2#100 R2-1714289, Internet,2018, 01 months, 03 days.
Qualcomm, Dormant BWP for fast SCell activation, and 3GPP TSG RAN WG2adhoc_2018_01_NR R2—Jan. 12, 2018 [ 1801432 or ].
Japanese Office Action dated Aug. 19, 2021, filed in JP2020537131.
Indian Office Action dated Aug. 2, 2021, filed in IN202027033107.

* cited by examiner

STATE PROCESSING METHOD, USER EQUIPMENT AND BASE STATION

CROSS REFERENCE OF RELATED APPLICATION

The present application is the U.S. national phase of PCT Application PCT/CN2018/125477 filed on Dec. 29, 2018, which claims a priority of Chinese patent application No.201810009128.2 filed on Jan. 4, 2018, which is incorporated herein by reference in its entirety.

TECHNICAL FIELD

The present disclosure relates to the field of communication technologies, and more particularly, to a state processing method, a user equipment and a base station.

BACKGROUND

Long term evolution LTE systems introduce carrier aggregation techniques. A carrier technology is that a user equipment UE connects and communicates with a network through a plurality of cells, one cell is a primary cell (PCell) and the other cells are secondary cells (SCells). The SCell may be in the activated/deactivated state and PCell may not be in a deactivated and remains activated.

When the base station adds one or more SCell through RRCConnectionReconfiguration (RRC connection reconfiguration message), the initial state of these SCells is deactivated; similarly, in the handover scenario, the target base station sends the SCell configuration information to the source base station through the HandoverCommand (handover command). When the source base station forwards the SCell configuration information to the UE through the RRCConnectionReconfiguration, the initial states of all the SCells are deactivated.

The UE maintains a deactivation timer sCellDeactivationTimer for each SCell. When the SCell switches to the activated state, the UE starts a corresponding sCellDeactivationTimer, and if the UE does not receive data or a Physical Downlink Control Channel (PDCCH) message on the corresponding SCell within a time specified by the sCellDeactivationTimer, the UE automatically deactivates the SCell.

In the communication system, the SCell introduces a new state which is a state between an activated state and a deactivated state. Since only the activated state and the deactivated state are defined in the related mechanism, after the new state is added, how to configure the state of the SCell for the user equipment is not defined explicitly, therefore it is urgent to solve the issue.

SUMMARY

A state processing method, a user equipment and a base station are provided in some embodiments of the present disclosure, to solve the issue caused by introducing a new state configuration.

In a first aspect, a state processing method for controlling a state of a secondary cell is provided in some embodiments of the present disclosure, including:

receiving state configuration information sent by a base station; and determining, based on the state configuration information, whether to set an initial state of the secondary cell and an initial state of a Bandwidth Part (BWP) associated with the secondary cell to a new state, where the new state is a state between an activated state and a deactivated state, and a quantity of secondary cells configured by the base station for a user equipment is at least one.

In a second aspect, a state processing method for controlling a state of a secondary cell is further provided in some embodiments of the present disclosure, including:

sending state configuration information to a user equipment, where the state configuration information is used by the user equipment to determine whether to set an initial state of the secondary cell and an initial state of a Bandwidth Part (BWP) associated with the secondary cell to a new state, where the new state is a state between an activated state and a deactivated state, and a quantity of secondary cells configured by a base station for the user equipment is at least one.

In a third aspect, a user equipment is further provided in some embodiments of the present disclosure, including:

a receiving module, configured to receive state configuration information sent by a base station; and a first determining module, configured to determine, based on the state configuration information, whether to set an initial state of the secondary cell and an initial state of a Bandwidth Part (BWP) associated with the secondary cell to a new state, where the new state is a state between an activated state and a deactivated state, and a quantity of secondary cells configured by a base station for the user equipment is at least one.

In a fourth aspect, a base station is further provided in some embodiments of the present disclosure, including:

a sending module, configured to send state configuration information to a user equipment, where the state configuration information is used by the user equipment to determine whether to set an initial state of the secondary cell and an initial state of a Bandwidth Part (BWP) associated with the secondary cell to a new state, where the new state is a state between an activated state and a deactivated state, and a quantity of secondary cells configured by the base station for the user equipment is at least one.

In a fifth aspect, a user equipment is further provided in some embodiments of the present disclosure, including a processor, a memory and a computer program stored in the memory and executable on the processor, where the computer program is executed by the processor to perform the state processing method hereinabove.

In a sixth aspect, a base station is further provided in some embodiments of the present disclosure, including a processor, a memory and a computer program stored in the memory and executable on the processor, where the computer program is executed by the processor to perform the state processing method hereinabove.

In a seventh aspect, a computer readable storage medium storing a computer program is further provided in some embodiments of the present disclosure, where the computer program is executed by a processor to perform the state processing method hereinabove.

According to some embodiments of the present disclosure, the initial state of the secondary cell and the initial state of the BWP associated with the secondary cell are configured by configuration information, to implement the configuration of the new state, thereby solving the issue caused by introducing the new state and supporting rapid activating/deactivating the secondary cell and the BWP.

BRIEF DESCRIPTION OF THE DRAWINGS

In order to describe the technical solution of some embodiments of the present disclosure more clearly, the drawings, which are required for use in the description of some embodiments of the present disclosure, are briefly described below. Obviously, the drawings in the following description are merely some of the embodiments of the present disclosure, and other drawings may be made from these drawings without any creative work for those skilled in the art.

DETAILED DESCRIPTION

The technical solution in some embodiments of the present disclosure will be clearly and completely described below in connection with the drawings in some embodiments of the present disclosure, and it will be apparent that the described embodiments are a part, but not all, of the embodiments of the present disclosure. Based on the embodiments in the present disclosure, all other embodiments obtained by a person of ordinary skill in the art without any creative work are within the scope of the present disclosure.

Figure 1:
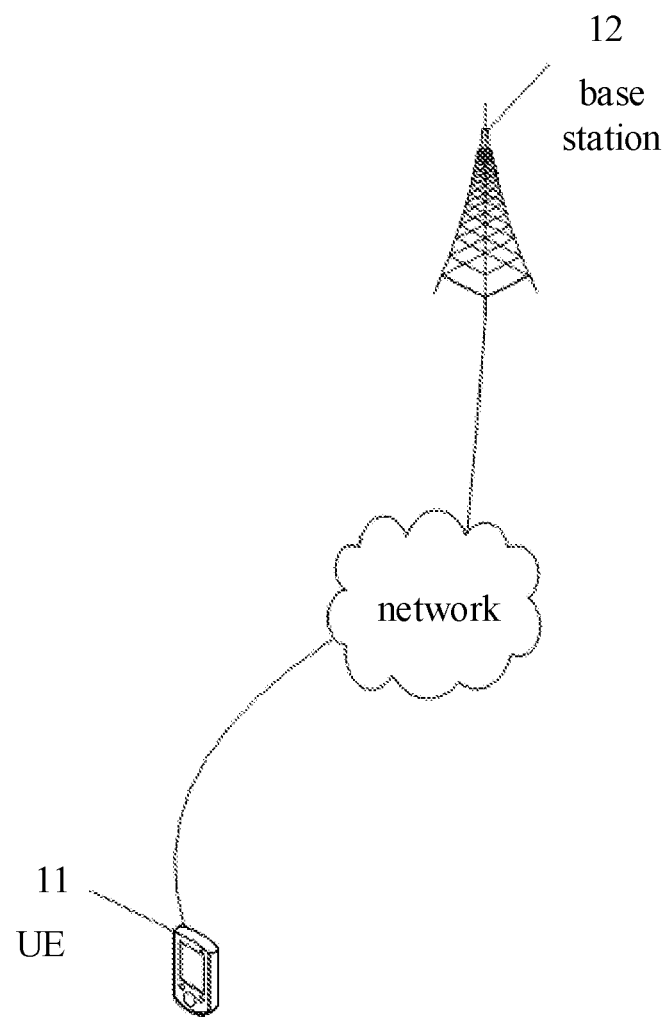
FIG. 1 is a schematic view of a network structure applicable in some embodiments of the present disclosure.

Referring to FIG. 1 which is a schematic view of a network structure applicable in some embodiments of the present disclosure. As shown in FIG. 1, the network structure includes a User Equipment (UE) 11 and a base station 12. The user equipment 11 may be a terminal-side device such as a mobile phone, a Tablet Personal Computer, a Laptop Computer, a personal digital assistant (PDA), a Mobile Internet Device (MID), or a Wearable Device. It should be noted that a specific type of the user equipment 11 is not limited in some embodiments of the present disclosure. The base station 12 may be a macro station, LTE eNB, 5G NR NB, or the like; the base station 12 may also be a small station, such as a low power node (LPN), pico or femto, or the base station 12 may be an access point (AP). The base station may also be a network node composed of a central unit (CU) and a plurality of transmission and reception points (TRP) managed and controlled by the central unit (CU). It should be noted that the particular type of base station 12 is not limited in some embodiments of the present disclosure.

Figure 2:
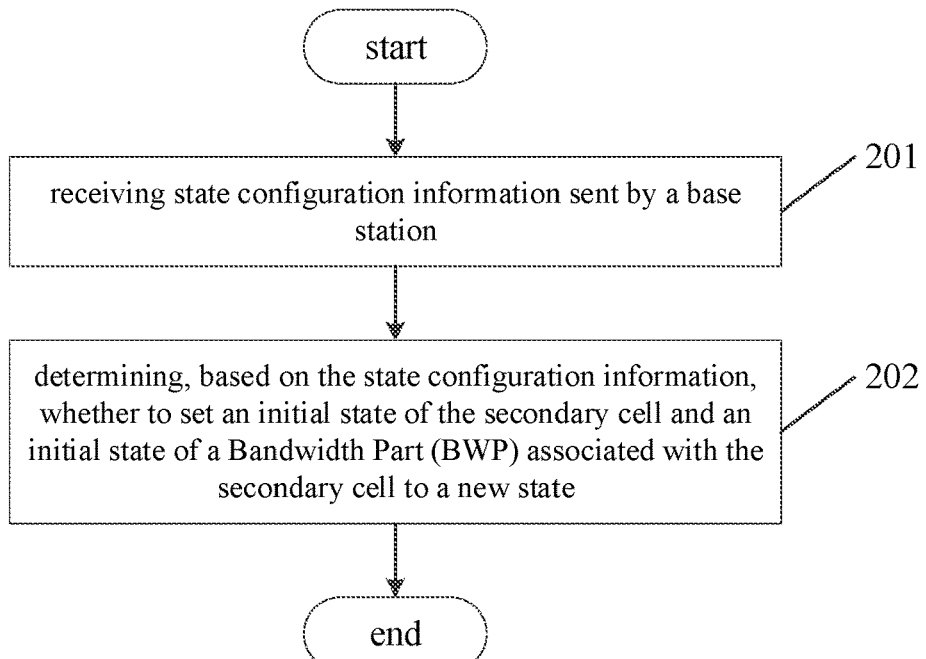
FIG. 2 is a first flow chart of a state processing method in some embodiments of the present disclosure.

Referring to FIG. 2, which is a flow chart of a state processing method in some embodiments of the present disclosure, as shown in FIG. 2, the method includes the following steps 201-202.

Step 201: receiving state configuration information sent by a base station.

The state processing method in some embodiments of the present disclosure is mainly applied to a user equipment for performing a state control on a secondary cell, and specifically, for controlling a state of a secondary cell of the user equipment and a BWP associated with the secondary cell.

In this step, the base station may transmit the state configuration information through the RRC connection reconfiguration message, for example, the base station may transmit the RRC connection reconfiguration message through RRC dedicated signaling. In some embodiments, the base station configures at least one the secondary cell for the user equipment. The state configuration information may be state configuration information configured by the source base station for the user equipment, or may be state configuration information configured by the target base station for the user equipment. For example, in one embodiment, a source base station configures a primary cell and a secondary cell for a user equipment, and the source base station may configure an initial state for each secondary cell through state configuration information, and configures an initial state for an BWP associated with each secondary cell, the initial state may include an activated state, a deactivated state or a new state. In another embodiment, the user equipment may perform a base station handover. In the handover process, the target base station to be handed over may configure state configuration information for the user equipment, and the target base station sends a handover command to the source base station of the user equipment, where the command carries the state configuration information. After receiving the handover command, the source base station forwards the handover command to the user equipment, thereby completing the transmission of the state configuration information. In the case that the state configuration information is information configured by the target base station for the user equipment, the state configuration information is configured to configure an initial state for each secondary cell which is handed over and an initial state configured for a BWP associated with each secondary cell which is handed over. That is, in some embodiments, step 201 includes receiving the state configuration information configured by the source base station for the user equipment; or receiving the state configuration information configured for the user equipment by a target base station to be handed over, where the target base station sends a handover command to a source base station, and the source base station forwards the handover command to the user equipment, where the handover command includes the state configuration information configured for the user equipment by the target base station.

Step 202: determining, based on the state configuration information, whether to set an initial state of the secondary cell and an initial state of a Bandwidth Part (BWP) associated with the secondary cell to a new state, where the new state is a state between an activated state and a deactivated state.

In this step, the initial state of the secondary cell and the initial state of the BWP associated with the secondary cell may be set according to the state configuration information. It should be noted that the number of the secondary cells whose initial states are set to the new state and the number of the BWPs, associated with the secondary cell, whose initial states are set to the new state may be set according to actual requirements, and is not limited herein. The initial state of each secondary cell may be set to any one of an activated state, a deactivated state and a new state; the state of the BWP associated with each secondary cell may also be set to any of an activated state, a deactivated state and a new state. It should be noted that since the secondary cell is associated with the BWP, the corresponding initial states thereof are also associated with each other, for example, an initial state of a secondary cell is configured to be a deactivated state, and correspondingly, all the BWP associated with this secondary cell should be construed to be configured to be a deactivated state. Meanwhile, if an initial state of a secondary cell is configured to be an activated state, correspondingly at least one of all BWPs associated with the secondary cell is construed to be configured to be an activated state. Specific configuration rules may be set according to actual requirements, and will not be described herein.

Therefore, according to some embodiments of the present disclosure, the initial state of the secondary cell and the initial state of the BWP associated with the secondary cell are configured by configuration information, to implement the configuration of the new state, thereby solving the issue caused by introducing the new state and supporting rapid activating/deactivating the secondary cell and the BWP.

Specifically, the secondary cells may be one or more (assuming N, N>1). According to the state configuration information, an initial state of 0, one, multiple (less than N) or all (equal to N) of all secondary cells may be set to a new state or an activated state or a deactivated state. In this case, the initial state of the secondary cell configured by the state configuration information includes any one of the following:

all secondary cells are in a new state;
part of the secondary cells are in a new state, and part of the secondary cells are in an activated state;
part of the secondary cells are in a new state, and part of the secondary cells are in a deactivated state;
part of secondary cells are in a new state, and part of the secondary cells are in an activated state, and part of the secondary cells are in a deactivated state;
all secondary cells are in an activated state;
all secondary cells are in a deactivated state;
part of the secondary cells are in an activated state, and part of the secondary cells are in a deactivated state.

In some embodiments, assuming that the number of secondary cells is 10, the initial states of all the secondary cells may be configured in any of the following seven cases in the manner described above:

Case 1: all 10 secondary cells are in a new state;
Case 2: A secondary cells are in a new state, B secondary cells are in an activated state, where both A and B are positive integers, and A+B=10;
Case 3: A secondary cells are in a new state, B secondary cells are in a deactivated state, where A and B are both positive integers, and A+B=10;
Case 4: A secondary cells are in a new state, B secondary cells are in an activated state, and C secondary cells are in a deactivated state, where A, B, and C are all positive integers, and A+B+C=10;
Case 5: all 10 secondary cells are in an activated state;
Case 6: all 10 secondary cells are in the deactivated state;
Case 7: A secondary cells are in an activated state, B secondary cells are in a deactivated state, where A and B are both positive integers, and A+B=10.

Specifically, the number of BWP associated with a certain secondary cell may be one or more (assuming N, N>1). According to the state configuration information, an initial state of 0, one, multiple (less than N) or all (equal to N) BWPs in the secondary cell may be set to a new state or an activated state or a deactivated state. In this case, the initial state of the BWP configuration associated with the secondary cell configured by the state configuration information includes any one of the following:

all BWPs are in a new state;
part of BWPs are in a new state and part of BWPs are in an activated state;
part of BWPs are in a new state and part of BWPs are in a deactivated state;
part of BWPs are in a new state, part of BWPs are in an activated state, and part of BWPs are in a deactivated state;
all BWPs are in an activated state;
all BWPs are in a deactivated state;
part of BWPs are in an activated state and part of BWPs are in a deactivated state.

In some embodiments, assuming that the number of BWP associated with a secondary cell is 10, the initial states of all the BWP may be configured in any of the following seven cases in the manner described above:

Case 1: 10 BWP are all in a new state;
Case 2: A BWPs are in a new state, B BWPs are in an activated state, where A and B are both positive integers, and A+B=10;
Case 3: A BWPs are in a new state, B BWPs are in a deactivated state, where A and B are both positive integers, and A+B=10;
Case 4: A BWPs are in a new state, B BWPs are in an activated state, C BWPs are in a deactivated state, where A, B and C are all positive integers, and A+B+C=10;
Case 5: 10 BWP are all active;
Case 6: 10 BWP are all deactivated;
Case 7: A BWPs are in an activated state, B secondary cells are in a deactivated state, where A and B are both positive integers, and A+B=10.

It should be noted that, based on the distribution of the initial state of the secondary cell and the initial state of the BWP associated with the secondary cell, in some embodiments of the present disclosure, the state configuration information includes first configuration information configured to indicate that the initial state of all or part of the secondary cell is the new state and indicate that the initial state of all or part of the BWPs associated with the secondary cell is the new state.

Further, a secondary cell state switching mechanism based on a new state timer may be introduced.

Specifically, in some embodiments, the state configuration information further includes second configuration information configured to indicate a length of a new state timer of the secondary cell, the method further comprises:

Step 203: setting the length of the new state timer of the secondary cell according to the second configuration information;

Step 204: starting the new state timer of the secondary cell upon entering the new state;

Step 205: switching the secondary cell to the deactivated state in the case that the new state timer of the secondary cell expires.

In some embodiments, the source base station may transmit the above state configuration information in the form of a RRC connection reconfiguration message via the RRC dedicated signaling, thereby configuring a value of the new state timer sCellDectivationTimer_NEW (i.e., the above length) for the user equipment. The user equipment may maintain a new state timer for each secondary cell. The lengths of the new state timers corresponding to each secondary cell may be the same or different (if the lengths of the secondary cells are set to be different, the state configuration information may indicate lengths corresponding to different secondary cells), which is not limited herein. When the secondary cell is in the new state, the user equipment may start or restart the corresponding new state timer. During the operation of the new state timer, in the case that the user equipment receives an indication in a Medium Access Control (MAC) Control Element (CE) from the base station which indicates that the corresponding secondary cell switches from the new state to the deactivated state, or switches from the new state to the activated state, or leaves the new state, the new state timer of the corresponding secondary cell is stopped. In the case that the new state timer expires, the corresponding secondary cell is switched to the deactivated state. Specifically, the base station may switch the state of the secondary cell or the BWP associated with the secondary cell or through the MAC CE.

It should be noted that if the user equipment receives the handover command, after the handover to the target base station, a new state timer that has been started and has not expired needs to be managed. Specifically, in some embodiments, in the case that the base station accessed by the user equipment is handed over to the target base station, the method further includes:

processing the new state timer in a first manner in the case that the new state timer of the secondary cell is started and does not expire, where the first manner includes any of:
controlling the new state timer to keep on running;
controlling the new state timer to stop running; and
controlling the new state timer to restart.

At the same time, the deactivation timer that has been started and has not expired needs to be managed. Specifically, in some embodiments, after the base station accessed by the user equipment is handed over to the target base station, the method further includes:

in the case that a deactivation timer of the secondary cell is started and does not expire, processing the deactivation timer of the secondary cell in a second manner, where the second manner includes any of:
controlling the deactivation timer to keep on running;
controlling the deactivation timer to stop running; and
controlling the deactivation timer to restart.

Further, in some embodiments of the present disclosure, a secondary cell state switching mechanism based on BWP switching may also be introduced. Specifically, after step 102, the method further includes:

determining a state of a target secondary cell according to a preset rule in the case that the user equipment performs a BWP switching, where the target secondary cell is a secondary cell corresponding to the BWP switching;

where the preset rules includes:

determining that the target secondary cell is in the new state, in the case that at least J BWPs of the M BWPs associated with the target secondary cell are in the new state;

determining that the target secondary cell is in the activated state, in the case that at most K BWPs of the M BWPs associated with the target secondary cell are in the new state and at least one BWP is in the activated state;

determining that the target secondary cell is in the deactivated state, in the case that all the BWPs associated with the target secondary cell are in the deactivated state;

where $M \geq 1$, $M \geq J \geq 1$, $K = J - 1$.

In some embodiments, each BWP of the M BWPs associated with the target secondary cell may be in a deactivated state, an activated state or a new state. Therefore, for different values of J, the target secondary cell may be determined to be in a new state or in an activated state. For example, after performing the BWP switching, the target secondary cell determined to be in the new state may include any one of the following cases:

Case 1: all BWPs are in a new state;
Case 2: part of BWPs are in a new state and part of BWPs are in an activated state;
Case 3: part of BWPs are in a new state and part of BWPs are in a deactivated state;

Case 4: part of BWPs are in a new state, part of BWPs are in an activated state, and part of BWPs are in a deactivated state.

Each of the above cases should include the states of all the BWPs associated with the target secondary cell. For example, in case 2, "part of BWPs are in a new state and part of BWPs are in an activated state" indicates that all the BWPs associated with the target secondary cell may be divided into two parts according to their states, one part is in a new state and the other part is in an activated state.

In case 3, "part of BWPs are in a new state and part of BWPs are in a deactivated state" indicates that all the BWPs associated with the target secondary cell may be divided into two parts according to their states, one part is in a new state and the other part is in a deactivated state.

In case 4, "part of BWPs are in a new state, part of BWPs are in an activated state, and part of BWPs are in a deactivated state" indicates that all the BWP associated with the target secondary cell may be divided into three parts according to their states, where the first part of BWPs are in a new state, the second part of BWPs are an activated state, and the third part of BWPs are a deactivated state.

At the same time, the target secondary cell determined to be in an activated state after performing the BWP switching may include any one of the following cases:

Case 5: part of BWPs are in a new state and part of BWPs are in an activated state;
Case 6: part of BWPs are in a new state, part of BWPs are in an activated state, and part of BWPs are in a deactivated state;
Case 7: all BWP are in an activated state;
Case 8: part of BWPs are in an activated state and part of BWPs are in a deactivated state.

In some embodiments, each of the above cases should include the states of all the BWPs associated with the target secondary cell. For example, in case 5, "part of BWPs are in a new state and part of BWPs are in an activated state" indicates that all the BWP associated with the target secondary cell may be divided into two parts according to their states, one part is in a new state and the other part is in an activated state.

In case 6, "part of BWPs are in a new state, part of BWPs are in an activated state, and part of BWPs are in a deactivated state" indicates that all the BWP associated with the target secondary cell may be divided into three parts according to their states, where the first part of BWPs are in a new state, the second part of BWPs are in an activated state, and the third part of BWPs are in a deactivated state.

In case 8, "part of BWPs are in an activated state and part of BWPs are in a deactivated state" indicates that all the BWP associated with the target secondary cell may be divided into two parts according to their states, one part is in an activated state and the other part is in a deactivated state.

It should be noted that the embodiments of the present disclosure may be implemented in combination with one another, or may be implemented separately, and the embodiments of the present disclosure are not limited thereto.

Figure 3:
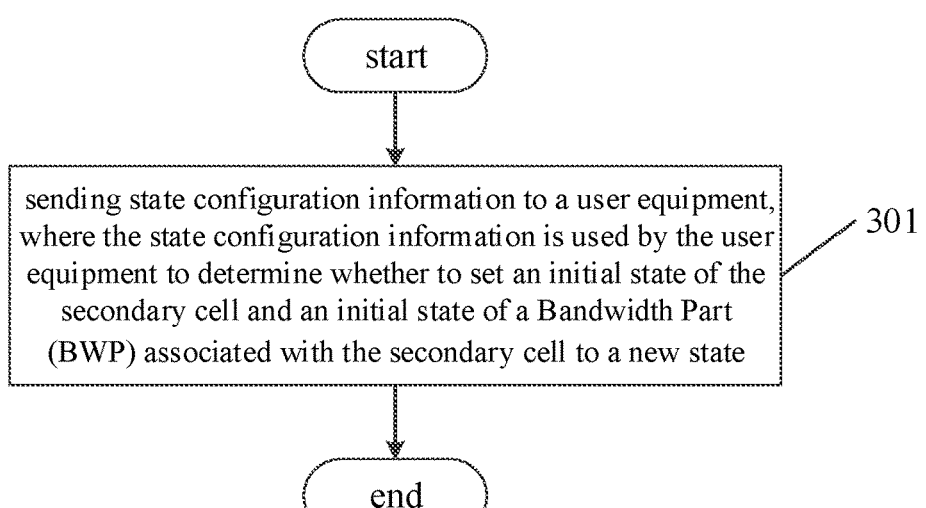
FIG. 3 is a second flow chart of a state processing method in some embodiments of the present disclosure.

Further, referring to FIG. 3, a state processing is further provided in some embodiments of the present disclosure, including:

Step 301: sending state configuration information to a user equipment, where the state configuration information is used by the user equipment to determine whether to set an initial state of the secondary cell and an initial state of a Bandwidth Part (BWP) associated with the secondary cell to a new state, where the new state is a state between an activated state and a deactivated state.

The state processing method in some embodiments of the present disclosure is mainly applied to a base station which is a source base station accessed by a user equipment, and is applied to control a state of a secondary cell. Specifically, the method is used for controlling a state of a secondary cell of the user equipment and a BWP associated with the secondary cell.

In this step, the base station may transmit the state configuration information through the RRC connection reconfiguration message, for example, the base station may transmit the RRC connection reconfiguration message through RRC dedicated signaling. In some embodiments, the base station configures at least one the secondary cell for the user equipment. The state configuration information may be state configuration information configured by the source base station for the user equipment, or may be state configuration information configured by the target base station for the user equipment. For example, in one embodiment, a source base station configures a primary cell and a secondary cell for a user equipment, and the source base station may configure an initial state for each secondary cell through state configuration information, and configures an initial state for an BWP associated with each secondary cell, the initial state may include an activated state, a deactivated state or a new state. In another embodiment, the user equipment may perform a base station handover. In the handover process, the target base station to be handed over may configure state configuration information for the user equipment, and the target base station sends a handover command to the source base station of the user equipment, where the command carries the state configuration information. After receiving the handover command, the source base station forwards the handover command to the user equipment, thereby completing the transmission of the state configuration information. In the case that the state configuration information is information configured by the target base station for the user equipment, the state configuration information is configured to configure an initial state for each secondary cell which is handed over and an initial state configured for a BWP associated with each secondary cell which is handed over. That is, in some embodiments, step 301 includes: sending, to the user equipment, the state configuration information configured for the user equipment by the base station; or sending, to the user equipment, the state configuration information configured for the user equipment by a target base station to be handed over, where the target base station sends a handover command to the base station, and the base station forwards the handover command to the user equipment, where the handover command includes the state configuration information configured for the user equipment by the target base station.

The user equipment may set the initial state of the secondary cell and the initial state of the BWP associated with the secondary cell according to the state configuration information. It should be noted that the number of the secondary cells whose initial states are set to the new state and the number of the BWPs, associated with the secondary cell, whose initial states are set to the new state may be set according to actual requirements, and is not limited herein. The initial state of each secondary cell may be set to any one of an activated state, a deactivated state and a new state; the state of the BWP associated with each secondary cell may also be set to any of an activated state, a deactivated state and a new state. It should be noted that since the secondary cell is associated with the BWP, the corresponding initial states thereof are also associated with each other, for example, an initial state of a secondary cell is configured to be a deactivated state, and correspondingly, all the BWP associated with this secondary cell should be construed to be configured to be a deactivated state. Meanwhile, if an initial state of a secondary cell is configured to be an activated state, correspondingly at least one of all BWPs associated with the secondary cell is construed to be configured to be an activated state. Specific configuration rules may be set according to actual requirements, and will not be described herein.

Therefore, according to some embodiments of the present disclosure, the initial state of the secondary cell and the initial state of the BWP associated with the secondary cell are configured by configuration information, to implement the configuration of the new state, thereby solving the issue caused by introducing the new state and supporting rapid activating/deactivating the secondary cell and the BWP.

Specifically, the secondary cells may be one or more (assuming N, N>1). According to the state configuration information, an initial state of 0, one, multiple (less than N) or all (equal to N) of all secondary cells may be set to a new state or an activated state or a deactivated state. In this case, the initial state of the secondary cell configured by the state configuration information includes any one of the following:

all secondary cells are in a new state;

part of the secondary cells are in a new state, and part of the secondary cells are in an activated state;

part of the secondary cells are in a new state, and part of the secondary cells are in a deactivated state;

part of secondary cells are in a new state, and part of the secondary cells are in an activated state, and part of the secondary cells are in a deactivated state;

all secondary cells are in an activated state;

all secondary cells are in a deactivated state;

part of the secondary cells are in an activated state, and part of the secondary cells are in a deactivated state.

Specifically, the number of BWP associated with a certain secondary cell may be one or more (assuming N, N>1). According to the state configuration information, an initial state of 0, one, multiple (less than N) or all (equal to N) BWPs in the secondary cell may be set to a new state or an activated state or a deactivated state. In this case, the initial state of the BWP configuration associated with the secondary cell configured by the state configuration information includes any one of the following:

all BWPs are in a new state;

part of BWPs are in a new state and part of BWPs are in an activated state;

part of BWPs are in a new state and part of BWPs are in a deactivated state;

part of BWPs are in a new state, part of BWPs are in an activated state, and part of BWPs are in a deactivated state;

all BWPs are in an activated state;

all BWPs are in a deactivated state;

part of BWPs are in an activated state and part of BWPs are in a deactivated state.

It should be noted that, based on the distribution of the initial state of the secondary cell and the initial state of the BWP associated with the secondary cell, in some embodiments of the present disclosure, the state configuration information includes first configuration information configured to indicate that the initial state of all or part of the secondary cell is the new state and indicate that the initial state of all or part of the BWPs associated with the secondary cell is the new state.

Further, a secondary cell state switching mechanism based on a new state timer may be introduced.

Specifically, in some embodiments, the state configuration information further includes second configuration information configured to indicate a length of a new state timer of the secondary cell.

In some embodiments, the source base station may transmit the above state configuration information in the form of a RRC connection reconfiguration message via the RRC dedicated signaling, thereby configuring a value of the new state timer sCellDectivationTimer_NEW (i.e., the above length) for the user equipment. The user equipment may maintain a new state timer for each secondary cell. The lengths of the new state timers corresponding to each secondary cell may be the same or different (if the lengths of the secondary cells are set to be different, the state configuration information may indicate lengths corresponding to different secondary cells), which is not limited herein. When the secondary cell is in the new state, the user equipment may start or restart the corresponding new state timer. During the operation of the new state timer, in the case that the user equipment receives an indication in a Medium Access Control (MAC) Control Element (CE) from the base station which indicates that the corresponding secondary cell switches from the new state to the deactivated state, or switches from the new state to the activated state, or leaves the new state, the new state timer of the corresponding secondary cell is stopped. In the case that the new state timer expires, the corresponding secondary cell is switched to the deactivated state. Specifically, the base station may switch the state of the secondary cell or the BWP associated with the secondary cell or through the MAC CE.

It should be noted that the embodiments of the present disclosure may be implemented in combination with one another, or may be implemented separately, and the embodiments of the present disclosure are not limited thereto.

Figure 4:
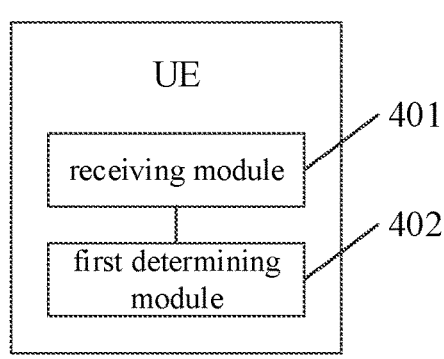
FIG. 4 is a first schematic view of a user equipment in some embodiments of the present disclosure.

Further, referring to FIG. 4 which is a schematic view of a user equipment in some embodiments of the present disclosure. The user equipment shown in FIG. 4 includes:

a receiving module 401, configured to receive state configuration information sent by a base station; and a first determining module 402, configured to determine, based on the state configuration information, whether to set an initial state of the secondary cell and an initial state of a Bandwidth Part (BWP) associated with the secondary cell to a new state, where the new state is a state between an activated state and a deactivated state, and a quantity of secondary cells configured by the base station for the user equipment is at least one.

Optionally, the state configuration information includes first configuration information configured to indicate that the initial state of all or part of the secondary cell is the new state and indicate that the initial state of all or part of the BWP associated with the secondary cell is the new state.

Optionally, the state configuration information further includes second configuration information configured to indicate a length of a new state timer of the secondary cell; the user equipment further includes:

a setting module, configured to set the length of the new state timer of the secondary cell according to the second configuration information;

a starting module, configured to start or restart the new state timer of the secondary cell upon entering the new state;

a first controlling module, configured to stop the new state timer of the secondary cell in the case that the user equipment receives an indication in a Medium Access Control (MAC) Control Element (CE) from the base station which indicates that the secondary cell switches from the new state to the deactivated state, or switches from the new state to the activated state, or leaves the new state; switch the secondary cell to the deactivated state in the case that the new state timer of the secondary cell expires.

Optionally, the base station sends the state configuration information through an RRC connection reconfiguration message.

Optionally, the receiving module 401 is configured to: receive the state configuration information configured for the user equipment by a source base station; or receive the state configuration information configured for the user equipment by a target base station to be handed over, where the target base station sends a handover command to a source base station, and the source base station forwards the handover command to the user equipment, where the handover command includes the state configuration information configured for the user equipment by the target base station.

Optionally, the user equipment further includes:

a first processing module, configured to process the new state timer in a first manner in the case that the base station accessed by the user equipment is handed over to the target base station and the new state timer of the secondary cell is started and does not expire, where the first manner includes any of:

controlling the new state timer to keep on running;
controlling the new state timer to stop running; and
controlling the new state timer to restart.

Optionally, the user equipment further includes:

a second processing module, configured to, in the case that the base station accessed by the user equipment is handed over to the target base station and a deactivation timer of the secondary cell is started and does not expire, process the deactivation timer of the secondary cell in a second manner, where the second manner includes any of:

controlling the deactivation timer to keep on running;
controlling the deactivation timer to stop running; and
controlling the deactivation timer to restart.

Optionally, the user equipment further includes:

a second determining module, configured to determine a state of a target secondary cell according to a preset rule in the case that the user equipment performs a BWP switching, where the target secondary cell is a secondary cell corresponding to the BWP switching;

where the preset rules includes:

determining that the target secondary cell is in the new state, in the case that at least J BWPs of the M BWPs associated with the target secondary cell are in the new state;

determining that the target secondary cell is in the activated state, in the case that at most K BWPs of the M BWPs associated with the target secondary cell are in the new state and at least one BWP is in the activated state;

determining that the target secondary cell is in the deactivated state, in the case that all the BWPs associated with the target secondary cell are in the deactivated state;

where $M \geq 1$, $M \geq J \geq 1$, $K=J-1$.

The user equipment provided in some embodiments of the present disclosure is capable of implementing various processes implemented by the user equipment in the method embodiment of FIG. 2. To avoid repetition, details are not described herein.

Figure 5:
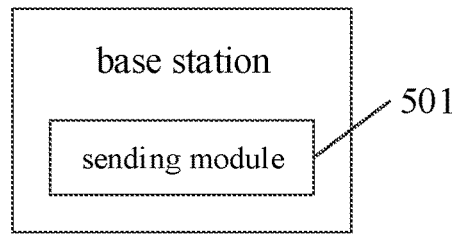
FIG. 5 is a first schematic view of a base station in some embodiments of the present disclosure.

Further, referring to FIG. 5 which is a schematic view of a base station in some embodiments of the present disclosure. As shown in FIG. 5, the base station includes:

a sending module 501, configured to send state configuration information to a user equipment, where the state configuration information is used by the user equipment to determine whether to set an initial state of the secondary cell and an initial state of a Bandwidth Part (BWP) associated with the secondary cell to a new state, where the new state is a state between an activated state and a deactivated state, and a quantity of secondary cells configured by the base station for the user equipment is at least one.

Optionally, the state configuration information includes first configuration information configured to indicate that the initial state of all or part of the secondary cell is the new state and indicate that the initial state of all or part of the BWP associated with the secondary cell is the new state.

Optionally, the state configuration information further includes second configuration information configured to indicate a length of a new state timer of the secondary cell.

Optionally, the sending module 501 is further configured to: send, to the user equipment, the state configuration information configured for the user equipment by the base station; or send, to the user equipment, the state configuration information configured for the user equipment by a target base station to be handed over, where the target base station sends a handover command to the base station, and the base station forwards the handover command to the user equipment through the sending module, where the handover command includes the state configuration information configured for the user equipment by the target base station.

The base station provided in some embodiments of the present disclosure is capable of implementing various processes implemented by the base station in the method embodiment of FIG. 3. To avoid repetition, details are not described herein.

Figure 6:
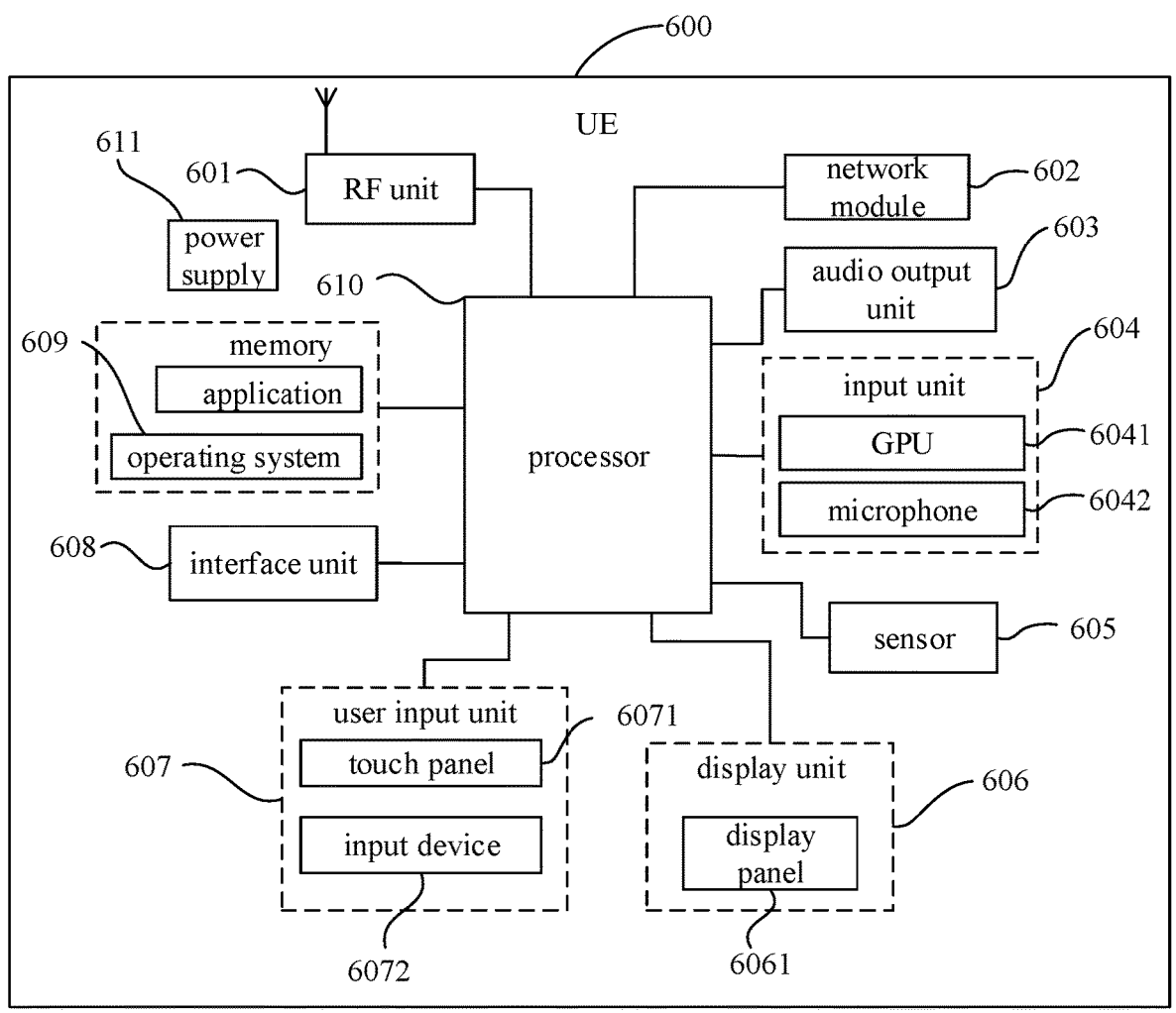
FIG. 6 is a second schematic view of a user equipment in some embodiments of the present disclosure.

FIG. 6 is a schematic view of a hardware structure of a user equipment in some embodiments of the present disclosure.

The user equipment 600 includes, but is not limited to, a radio frequency unit 601, a network module 602, an audio output unit 603, an input unit 604, a sensor 605, a display unit 606, a user input unit 607, an interface unit 608, a memory 609, a processor 610, and a power supply 611. It will be appreciated by those skilled in the art that the structure of the user equipment shown in FIG. 6 does not constitute a limitation on the user equipment, which may include more or fewer components than illustrated, or may combine certain components, or different component arrangements. In some embodiments of the present disclosure, the user equipment includes, but is not limited to, a mobile phone, a tablet computer, a notebook computer, a palmtop computer, an in-vehicle terminal, a wearable device, a pedometer, and the like.

The radio frequency unit 601 is configured to receive state configuration information sent by a base station.

The processor 610 is configured to determine, based on the state configuration information, whether to set an initial state of the secondary cell and an initial state of a Bandwidth Part (BWP) associated with the secondary cell to a new state, where the new state is a state between an activated state and a deactivated state, and a quantity of secondary cells configured by the base station for the user equipment is at least one.

Optionally, the state configuration information includes first configuration information configured to indicate that the initial state of all or part of the secondary cell is the new state and indicate that the initial state of all or part of the BWP associated with the secondary cell is the new state.

Optionally, the state configuration information further includes second configuration information configured to indicate a length of a new state timer of the secondary cell; the processor 610 is further configured to: set the length of the new state timer of the secondary cell according to the second configuration information; start or restart the new state timer of the secondary cell upon entering the new state; stop the new state timer of the secondary cell in the case that the user equipment receives an indication in a Medium Access Control (MAC) Control Element (CE) from the base station which indicates that the secondary cell switches from the new state to the deactivated state, or switches from the new state to the activated state, or leaves the new state; switch the secondary cell to the deactivated state in the case that the new state timer of the secondary cell expires.

Optionally, the base station sends the state configuration information through an RRC connection reconfiguration message.

Optionally, radio frequency unit 601 is further configured to: receive the state configuration information configured for the user equipment by a source base station; or receive the state configuration information configured for the user equipment by a target base station to be handed over, where the target base station sends a handover command to a source base station, and the source base station forwards the handover command to the user equipment, where the handover command includes the state configuration information configured for the user equipment by the target base station.

Optionally, the processor 610 is further configured to: process the new state timer in a first manner in the case that the new state timer of the secondary cell is started and does not expire, where the first manner includes any of:
controlling the new state timer to keep on running;
controlling the new state timer to stop running; and
controlling the new state timer to restart.

Optionally, the processor 610 is further configured to, in the case that the base station accessed by the user equipment is handed over to the target base station and a deactivation timer of the secondary cell is started and does not expire, process the deactivation timer of the secondary cell in a second manner, where the second manner includes any of:
controlling the deactivation timer to keep on running;
controlling the deactivation timer to stop running; and
controlling the deactivation timer to restart.

Optionally, the processor 610 is further configured to, determine a state of a target secondary cell according to a preset rule in the case that the user equipment performs a BWP switching, where the target secondary cell is a secondary cell corresponding to the BWP switching, the preset rule includes:
where the preset rules includes:
determining that the target secondary cell is in the new state, in the case that at least J BWPs of the M BWPs associated with the target secondary cell are in the new state;
determining that the target secondary cell is in the activated state, in the case that at most K BWPs of the M BWPs associated with the target secondary cell are in the new state and at least one BWP is in the activated state;
determining that the target secondary cell is in the deactivated state, in the case that all the BWPs associated with the target secondary cell are in the deactivated state;
where $M \geq 1$, $M \geq J \geq 1$, $K = J - 1$.

Therefore, according to some embodiments of the present disclosure, the initial state of the secondary cell and the initial state of the BWP associated with the secondary cell are configured by configuration information, to implement the configuration of the new state, thereby solving the issue caused by introducing the new state and supporting rapid activating/deactivating the secondary cell and the BWP.

It should be understood that in some embodiments of the present disclosure, the radio frequency unit 601 may be used to receive and transmit signals during transmission and reception of information or a call, and specifically, receive downlink data from a base station and then process the received downlink data to the processor 610. The uplink data is transmitted to the base station. Generally, the radio frequency unit 601 includes, but is not limited to, an antenna, at least one amplifier, a transceiver, a coupler, a low noise amplifier, a duplexer, and the like. In addition, the radio frequency unit 601 may also communicate with the network and other devices through a wireless communication system.

The user equipment provides wireless broadband Internet access to the user through the network module 602, such as assisting the user in receiving and sending email, browsing web pages, and accessing streaming media, etc.

The audio output unit 603 may convert the audio data received by the radio frequency unit 601 or the network module 602 or stored in the memory 609 into an audio signal and output as sound. Moreover, the audio output unit 603 may also provide audio output (e.g., call signal reception sound, message reception sound, etc.) related to a specific function performed by the user equipment 600. The audio output unit 603 includes a speaker, a buzzer, a receiver, and the like.

The input unit 604 is adapted to receive an audio or video signal. The input unit 604 may include a Graphics Processing Unit (GPU) 6041 and a microphone 6042, and the Graphics Processing Unit 6041 processes image data of still pictures or videos obtained by an image capturing apparatus (such as a camera) in a video capturing mode or an image capturing mode. The processed image frame may be displayed on the display unit 606. The image frames processed by graphics processor 6041 may be stored in memory 609 (or other storage medium) or transmitted via radio frequency unit 601 or network module 602. The microphone 6042 can receive sound and can process such sound into audio data. The processed audio data may be converted into a format output that may be transmitted to the mobile communication base station via the radio frequency unit 601 in the case of a telephone talk mode.

The user equipment 600 also includes at least one sensor 605, such as a light sensor, a motion sensor, and other sensors. Specifically, the light sensor includes an ambient light sensor that can adjust the brightness of the display panel 6061 according to the brightness of the ambient light, and a proximity sensor that can close the display panel 6061 and/or backlight in the case that the user equipment 600 moves to the ear. As one of the motion sensors, the accelerometer sensor can detect the magnitude of the acceleration in each direction (generally three axes), can detect the magnitude and direction of the gravity in the case that stationary, and can be used to identify the attitude of the user equipment (such as horizontal/vertical screen switching, related games, magnetometer attitude calibration), vibration identification related functions (such as pedometer, knocking), and the like; The sensor 605 may further include a fingerprint sensor, a pressure sensor, an iris sensor, a molecular sensor, a gyroscope, a barometer, a hygrometer, a thermometer, an infrared sensor, and the like. Details are not described herein.

The display unit 606 is used to display information input by or provided to the user. The display unit 606 may include a display panel 6061, which may be configured in the form of a Liquid Crystal Display (LCD), an Organic Light-Emitting Diode (OLED), or the like.

The user input unit 607 may be configured to receive the input number or character information, and to generate a key signal input related to the user setting and the function control of the user equipment. Specifically, the user input unit 607 includes a touch panel 6071 and other input devices 6072. The touch panel 6071, also referred to as a touch screen, may collect touch operations on or near the user (e.g., operations on or near the touch panel 6071 using any suitable object or accessory, such as a finger, stylus, or the like). The touch panel 6071 may include both a touch detection device and a touch controller. Wherein the touch detection means detects a touch orientation of the user, detects a signal brought about by the touch operation, and sends the signal to the touch controller; The touch controller receives touch information from the touch detection device and converts the touch information into contact coordinates, and sends the contact coordinates to the processor 610 to receive and execute commands sent from the processor 610. In addition, the touch panel 6071 may be implemented in various types such as a resistive type, a capacitive type, an infrared ray, and a surface acoustic wave. In addition to the touch panel 6071, the user input unit 607 may also include an input device 6072. Specifically, the input device 6072 may include, but is not limited to, a physical keyboard, a function key (such as a volume control key, an on-off key, or the like), a trackball, a mouse, and a joystick. Details are not described herein.

Further, the touch panel 6071 may be overlaid on the display panel 6061, and in the case that the touch panel 6071 detects a touch operation on or near the touch panel, the touch panel 6071 is transmitted to the processor 610 to determine a type of a touch event, and then the processor 610 provides a corresponding visual output on the display panel 6061 according to the type of the touch event. Although in FIG. 6, the touch panel 6071 and the display panel 6061 are implemented as two separate components to implement the input and output functions of the user equipment, in some embodiments, the touch panel 6071 and the display panel 6061 may be integrated to implement the input and output functions of the user equipment, which are not specifically limited herein.

The interface unit 608 is an interface through which an external device is connected to the user equipment 600. For example, an external device may include a wired or wireless headset port, an external power (or battery charger) port, a wired or wireless data port, a memory card port, a port for connecting a device having an identification module, an audio input/output (I/O) port, a video I/O port, a headset port, and the like. The interface unit 608 may be used to receive input (e.g., data information, power, etc.) from an external device and transmit the received input to one or more elements within the user equipment 600 or may be used to transmit data between the user equipment 600 and the external device.

Memory 609 may be used to store software programs and various data. The memory 609 may mainly include a storage program area and a storage data area, wherein the storage program area may store an operating system, an application program (such as a sound play function, an image play function, and the like) required by at least one function, and the like; The storage data area may store data (such as audio data, a phone book, and the like) created according to use of the handset, and the like. In addition, memory 609 may include high speed random access memory, and may also include non-volatile memory, such as at least one magnetic disk storage device, flash memory device, or other volatile solid state storage device.

The processor 610 is a control center of the user equipment, connects various parts of the entire user equipment by various interfaces and lines, executes various functions of the user equipment and processes data by running or executing software programs and/or modules stored in the memory 609 and invoking data stored in the memory 609, thereby performing overall monitoring on the user equipment. Processor 610 may include one or more processing units; alternatively, the processor 610 may integrate an application processor and a modem processor, wherein the application processor mainly processes an operating system, a user interface, an application program, and the like, and the modem processor mainly processes wireless communication. It will be appreciated that the modem processor may also not be integrated into the processor 610.

The user equipment 600 may also include a power supply 611 (such as a battery) that supplies power to the various components. Optionally, the power supply 611 may be logically connected to the processor 610 through a power management system, thereby implementing functions such as managing charging, discharging, and power consumption management through the power management system.

In addition, the user equipment 600 includes functional modules not shown, and details are not described herein.

Optionally, a user equipment is further provided in some embodiments of the present disclosure, including a processor 610, a memory 609, and a computer program stored in the memory 609 and operable on the processor 610. The computer program, in the case that executed by the processor 610, implements the processes of the state processing method embodiments described above, and achieves the same technical effect. To avoid repetition, details are not described herein.

Figure 7:
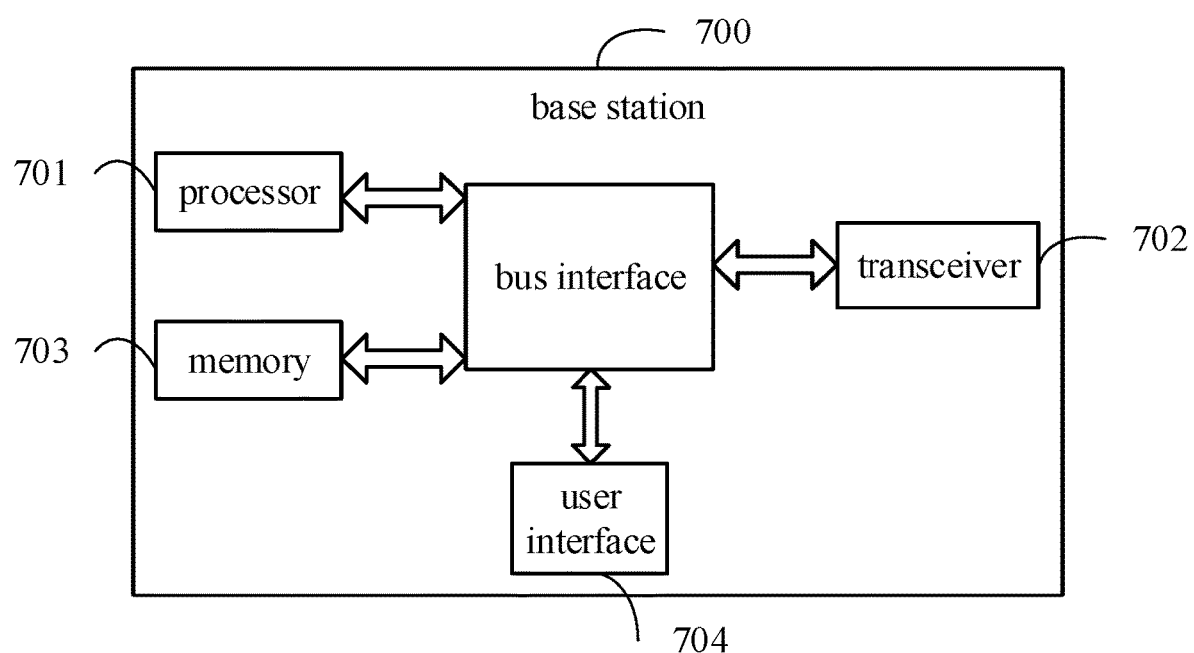
FIG. 7 is a second schematic view of a base station in some embodiments of the present disclosure.

Referring to FIG. 7, which is a block diagram of a base station in some embodiments of the present disclosure, details of the state processing method in the above-described embodiments can be realized and the same effect can be achieved. As shown in FIG. 7, a base station 700 includes a processor 701, a transceiver 702, a memory 703, a user interface 704, and a bus interface.

The processor 701 is configured to read a program in the memory 703 to perform: sending state configuration information to a user equipment, where the state configuration information is used by the user equipment to determine whether to set an initial state of the secondary cell and an initial state of a Bandwidth Part (BWP) associated with the secondary cell to a new state, where the new state is a state between an activated state and a deactivated state, and a quantity of secondary cells configured by the base station for the user equipment is at least one.

In FIG. 7, the bus architecture may include any number of interconnected buses and bridges, specifically one or more processors represented by processor 701 and various circuits of memory represented by memory 703 linked together. The bus architecture may also link various other circuits, such as peripherals, voltage regulators, and power management circuits, all of which are well known in the art and therefore will not be described further herein. The bus interface provides an interface. Transceiver 702 may be a plurality of elements, including a transmitter and a receiver, providing units for communicating with various other devices on a transmission medium. For different user devices, the user interface 704 may also be an interface capable of externally and externally connecting a desired device, including, but not limited to, a keypad, a display, a speaker, a microphone, a joystick, and the like.

The processor 701 is responsible for managing the bus architecture and general processing, and the memory 703 may store data used by the processor 701 in performing operations.

Optionally, the state configuration information includes first configuration information configured to indicate that the initial state of all or part of the secondary cell is the new state and indicate that the initial state of all or part of the BWP associated with the secondary cell is the new state.

Optionally, the state configuration information further includes second configuration information configured to indicate a length of a new state timer of the secondary cell.

Optionally, the program is executed by the processor 701 to perform: sending, to the user equipment, the state configuration information configured for the user equipment by the base station; or sending, to the user equipment, the state configuration information configured for the user equipment by a target base station to be handed over, where the target base station sends a handover command to the base station, and the base station forwards the handover command to the user equipment, where the handover command includes the state configuration information configured for the user equipment by the target base station.

Therefore, according to some embodiments of the present disclosure, the initial state of the secondary cell and the initial state of the BWP associated with the secondary cell are configured by configuration information, to implement the configuration of the new state, thereby solving the issue caused by introducing the new state and supporting rapid activating/deactivating the secondary cell and the BWP A computer-readable storage medium storing a computer program is further provide in some embodiments of the present disclosure, where the computer program is executed by a processor to perform the state processing method in the embodiments hereinabove and achieves the same technical effect. To avoid repetition, details are not described herein. The computer-readable storage medium of the present disclosure may be a volatile memory or a non-volatile memory, or may include both a volatile memory and a non-volatile memory, such as a Read-Only Memory (ROM), a Random Access Memory (RAM), a magnetic disk, or an optical disk.

Those of ordinary skill in the art will recognize that the elements and algorithm steps of the examples described in connection with the embodiments disclosed herein can be implemented in electronic hardware, or a combination of computer software and electronic hardware. Whether these functions are performed in hardware or software depends on the particular application and design constraints of the solution. The skilled artisan may use different methods to implement the described functions for each particular application, but such implementation should not be considered to be outside the scope of the present disclosure.

It will be apparent to those skilled in the art that for the convenience and brevity of the description, reference may be made to the corresponding processes in the foregoing method embodiments for the specific working procedures of the above-described systems, apparatuses and units, and details will not be described herein.

In the embodiments provided herein, it should be understood that the disclosed apparatus and method may be implemented in other ways. For example, the device embodiments described above are merely illustrative, for example, the division of the cells is merely a logical functional division, and there may be additional division in practice, for example, a plurality of cells or components may be combined or integrated into another system, or some features may be ignored or not performed. On the other hand, the coupling or direct coupling or communication connection between each other shown or discussed may be through some interface, indirect coupling or communication connection of a device or unit, and may be in electrical, mechanical or other form.

The elements illustrated as separate elements may or may not be physically separate, and the elements shown as elements may or may not be physical elements, may be located at one location, or may be distributed across multiple network elements. Some or all of the elements may be selected to achieve the purpose of some of the embodiments of the present disclosure according to actual needs.

In addition, the functional units in the various embodiments of the present disclosure may be integrated in one processing unit, may be separate physical units, or may be integrated in two or more units.

The functions, if implemented as software functional units and sold or used as separate products, may be stored in a computer-readable storage medium. Based on such an understanding, the technical solution of the present disclosure may essentially be embodied in the form of a software product that is stored in a storage medium and includes instructions for causing a computer device (which may be a personal computer, a server, or a network device) to perform all or a portion of the steps of the methods described in the various embodiments of the present disclosure. The storage medium includes a USB flash drive, a removable hard disk, a ROM, a RAM, a magnetic disk, or an optical disk.

The foregoing description is merely some embodiments of the present disclosure, but the scope of the present disclosure is not limited thereto. Variations or substitutions may readily occur to those skilled in the art within the technical scope of the present disclosure, and are intended to be included within the scope of the present disclosure. Accordingly, the scope of the present disclosure should be subject to the scope of the claims.

What is claimed is:

1. A state processing method for controlling a state of a secondary cell, comprising:
    receiving state configuration information sent by a base station; and
    determining, based on the state configuration information, whether to set an initial state of the secondary cell and an initial state of a Bandwidth Part (BWP) associated with the secondary cell to a new state, wherein the new state is a state between an activated state and a deactivated state, and a quantity of secondary cells configured by the base station for a user equipment is at least one;
    wherein subsequent to the determining, based on the state configuration information, whether to set the initial state of the secondary cell and the initial state of the BWP associated with the secondary cell to the new state, the method further comprises:
    determining a state of a target secondary cell according to a preset rule in the case that the user equipment performs a BWP switching, wherein the target secondary cell is a secondary cell corresponding to the BWP switching;
    wherein the preset rules comprises:
    determining that the target secondary cell is in the new state, in the case that at least J BWPs of the M BWPs associated with the target secondary cell are in the new state;
    determining that the target secondary cell is in the activated state, in the case that at most K BWPs of the M BWPs associated with the target secondary cell are in the new state and at least one BWP is in the activated state;
    determining, that the secondary cell is in the deactivated state, in the case that all the BWPs associated with the target secondary cell are in the deactivated state;
    where $M \geq 1$, $M \geq J \geq 1$, $K=J-1$.

2. The method according to claim 1, wherein the state configuration information comprises first configuration information configured to indicate that the initial state of all or part of the secondary cell is the new state and indicate that the initial state of all or part of the BWPs associated with the secondary cell is the new state.

3. The method according to claim 1, wherein the state configuration information further comprises second configuration information configured to indicate a length of a new state timer of the secondary cell;
    subsequent to the receiving the state configuration information sent by the base station, the method further comprises:
    setting the length of the new state timer of the secondary cell according to the second configuration information;
    starting or restarting the new state timer of the secondary cell upon entering the new state;
    stopping the new state timer of the secondary cell in the case that the user equipment receives an indication in a Medium Access Control (MAC) Control Element (CE) from the base station which indicates that the secondary cell switches from the new state to the deactivated state, or switches from the new state to the activated state, or leaves the new state;
    switching the secondary cell to the deactivated state in the case that the new state timer of the secondary cell expires.

4. The method according to claim 3, wherein the base station sends the state configuration information through an RRC connection reconfiguration message.

5. The method according to claim 3, wherein the receiving the state configuration information sent by the base station comprises:
    receiving the state configuration information configured for the user equipment by a source base station; or
    receiving the state configuration information configured for the user equipment by a target base station to be handed over, wherein the state configuration information is contained in a handover command which is sent to a source base station by the target base station and forwarded to the user equipment by the source base station.

6. The method according to claim 5, wherein in the case that the base station accessed by the user equipment is handed over to the target base station, the method further comprises:
    processing the new state timer in a first manner in the case that the new state timer of the secondary cell is started and does not expire, wherein the first manner comprises any of:
    controlling the new state timer to keep on running;
    controlling the new state timer to stop running; and
    controlling the new state timer to restart.

7. The method according to claim 5, wherein in the case that the base station accessed by the user equipment is handed over to the target base station, the method further comprises:
    in the case that a deactivation timer of the secondary cell is started and does not expire, processing the deactivation timer of the secondary cell in a second manner, wherein the second manner comprises any of:
controlling the deactivation timer to keep on running;
controlling the deactivation timer to stop running; and
controlling the deactivation timer to restart.

8. A state processing method for controlling a state of a secondary cell, comprising:
sending state configuration information to a user equipment, wherein the state configuration information is used by the user equipment to determine whether to set an initial state of the secondary cell and an initial state of a Bandwidth Part (BWP) associated with the secondary cell to a new state, to determine a state of a target secondary cell according to a preset rule in the case that the user equipment performs a BWP switching, after whether to set the initial state of the secondary cell and the initial state of the BWP associated with the secondary cell to the new state is determined, wherein the target secondary cell is a secondary cell corresponding to the BWP switching;
wherein the preset rules comprises:
determining that the target secondary cell is in the new state, in the case that at least K BWPs of the M BWPs associated with the target secondary cell are in the new state;
determining that the target secondary cell is in the activated state, in the case that at most K BWPs of the M BWPs associated with the target secondary cell are in the new state and at least one BWP is in the activated state;
determining that the target secondary cell is in the deactivated state, in the case that all the BWPs associated with the target secondary cell are in the deactivated state;
where M≥1, M≥J≥1, K=J−1;
wherein the new state is a state between an activated state and a deactivated state, and a quantity of secondary cells configured by a base station for the user equipment is at least one.

9. The method according to claim 8, wherein the state configuration information comprises first configuration information configured to indicate that the initial state of all or part of the secondary cell is the new state and indicate that the initial state of all or part of the BWPs associated with the secondary cell is the new state.

10. The method according to claim 9, wherein the sending the state configuration information to the user equipment comprises:
sending, to the user equipment, the state configuration information configured for the user equipment by the base station; or
sending, to the user equipment, the state configuration information configured for the user equipment by a target base station to be handed over, wherein the state configuration information is contained in a handover command which is sent to the base station by the target base station and forwarded to the user equipment by the base station.

11. The method according to claim 8, wherein the state configuration information further comprises second configuration information configured to indicate a length of a new state timer of the secondary cell.

12. A user equipment, comprising: a processor, a memory and a computer program stored in the memory and executable on the processor, wherein the computer program is executed by the processor to:
receive state configuration information sent by a base station; and
determine, based on the state configuration information, whether to set an initial state of the secondary cell and an initial state of a Bandwidth Part (BWP) associated with the secondary cell to a new state, wherein the new state is a state between an activated state and a deactivated state, and a quantity of secondary cells configured by the base station for the user equipment is at least one;
wherein the computer program is executed by the processor to:
determine a state of a target secondary cell according to a preset rule in the case that the user equipment performs a BWP switching, wherein the tar et secondary cell is a secondary cell corresponding to the BWP switching;
wherein the preset rules comprises:
determining that the target secondary cell is in the new state, in the case that at least J BWPs of the M BWPs associated with the target secondary cell are in the new state;
determining that the target secondary cell is in the activated state, in the case that at most K BWPs of the M BWPs associated with the target secondary cell are in the new state and at least one BWP is in the activated state;
determining that the target secondary cell is in the deactivated state, in the case that all the BWPs associated with the target secondary cell are in the deactivated state;
where M≥1, M≥J≥1, K=J−1.

13. The user equipment according to claim 12, wherein the state configuration information comprises first configuration information configured to indicate that the initial state of all or part of the secondary cell is the new state and indicate that the initial state of all or part of the BWPs associated with the secondary cell is the new state.

14. The user equipment according to claim 12, wherein the state configuration information further comprises second configuration information configured to indicate a length of a new state timer of the secondary cell;
the computer program is executed by the processor to:
set the length of the new state timer of the secondary cell according to the second configuration information;
start or restart the new state timer of the secondary cell upon entering the new state;
stop the new state timer of the secondary cell in the case that the user equipment receives an indication in a Medium Access Control (MAC) Control Element (CE) from the base station which indicates that the secondary cell switches from the new state to the deactivated state, or switches from the new state to the activated state, or leaves the new state; switch the secondary cell to the deactivated state in the case that the new state timer of the secondary cell expires.

15. The user equipment according to claim 14, wherein the computer program is executed by the processor to:
receive the state configuration information configured for the user equipment by a source base station; or
receive the state configuration information configured for the user equipment by a target base station to be handed over, wherein the state configuration information is contained in a handover command which is sent to a source base station by the target base station and forwarded to the user equipment by the source base station.

16. The user equipment according to claim 15, wherein the computer program is executed by the processor to:
process the new state timer in a first manner in the case that the base station accessed by the user equipment is handed over to the target base station and the new state timer of the secondary cell is started and does not expire, wherein the first manner comprises any of:
controlling the new state timer to keep on running;
controlling the new state timer to stop running; and
controlling the new state timer to restart.

17. The user equipment according to claim 15, wherein the computer program is executed by the processor to:
in the case that the base station accessed by the user equipment is handed over to the target base station and a deactivation timer of the secondary cell is started and does not expire, process the deactivation timer of the secondary cell in a second manner, wherein the second manner comprises any of:
controlling the deactivation timer to keep on running;
controlling the deactivation timer to stop running; and
controlling the deactivation timer to restart.

18. A base station, comprising a processor, a memory and a computer program stored in the memory and executable on the processor, wherein the computer program is executed by the processor to perform the state processing method according to claim 8.

* * * * *